May 4, 1937. F. H. HOFFMAN 2,079,288
FOOD COMPOUND AND METHOD OF MAKING THE SAME
Filed Jan. 8, 1936
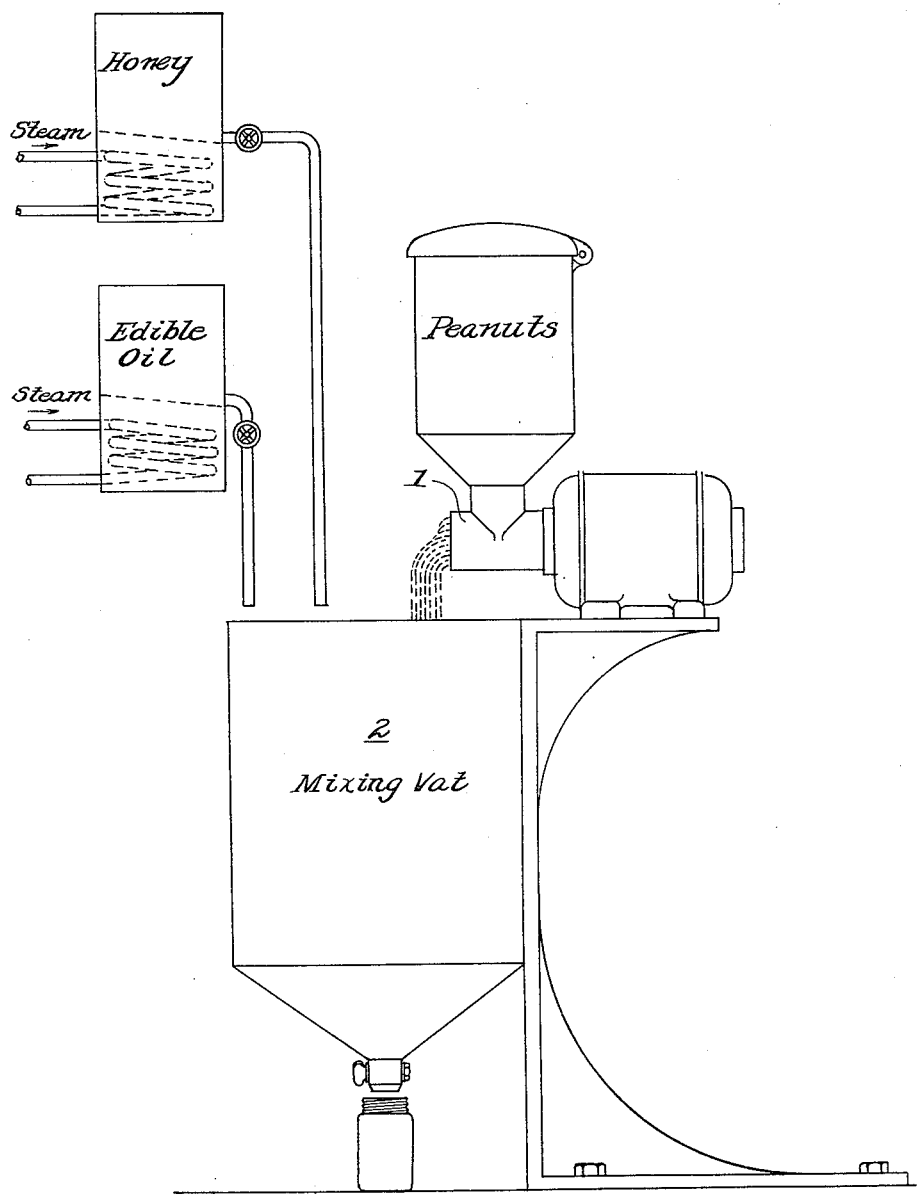
Inventor
Frederick H. Hoffman
By W. S. M. Howell
Attorney Patented May 4, 1937

2,079,288

UNITED STATES PATENT OFFICE 2,079,288

FOOD COMPOUND AND METHOD OF MAKING THE SAME

Frederick H. Hoffman, Columbus, Ohio

Application January 8, 1936, Serial No. 58,151

1 Claim. (Cl. 99—128)

This invention relates to food compounds and more particularly to compounds of the type which are employed as a spread for or upon other foods, such as bread, crackers and the like. More specifically, the invention relates to a food compound composed primarily of peanut butter and honey.

Peanut butter prepared by grinding the clean kernels of roasted peanuts, is a rather stiff, semi-solid substance and while quite nutritious, it is objectionable to many users because of its dryness and the tendency thereof to adhere to the mouth when being eaten. It has been proposed heretofore to combine with peanut butter natural bees' honey with the view of producing a food compound of a more palatable character than ordinary peanut butter alone. Natural honey, if exposed to air for any considerable period of time, tends to crystallize and thicken so that it does not relieve the compound of the objectionable dryness heretofore noted in reference to peanut butter alone.

It is therefore an object of the present invention to provide a food compound composed of peanut butter and honey with an added edible oil in quantity sufficient to maintain the compound, when packed in containers and during periods of storage, shipment and use, in a desired state of plasticity, preventing the drying of the peanut butter and honey, maintaining the compound in such a state that it may be readily used as a spread on other articles of food and to deprive the same of its ordinary tendency to clog or stick to the roof of the mouth, and yet to prevent undue separation of the oil from the solids of the compounds when not in use and when subjected to varying temperatures.

There is a noticeable tendency on the part of peanut butter, even when admixed with honey for the oil content thereof to separate out of the composition and to collect in the form of a layer on the top of the compound. This is objectionable to many users and it is one of the purposes of the present invention to provide an improved method of producing the compound so that the aforesaid tendency of the oil to accumulate on the top of the compound will be prevented or minimized and the necessity of mixing the free oil with the solids of the compound following periods of non-use avoided.

In accordance with the present invention, my improved compound is composed principally of peanut butter, to which is added ordinary bees' honey and an edible oil. To blend these ingredients smoothly and to minimize the tendency of the oil to separate, the oil and honey are heated to a temperature of approximately 160° F. The peanut butter is produced in the usual reduction or grinding mill and when discharged from said mill in the form of a paste, it possesses approximately a temperature of 160° F. The edible oil and honey, while at approximately above specified temperature, are mixed with the peanut butter immediately upon the discharge of the latter from the grinding or reduction mill, and are delivered to a stirring vat, where all of the compounds of the mixture are thoroughly mixed and subsequently placed in commercial containers.

In the accompanying drawing, wherein the single figure illustrates diagrammatically apparatus which may be employed in carrying out the present invention, the numeral 1 designates a grinding or reduction mill in which the peanut butter content is produced. In this mill peanut butter is prepared by grinding the clean kernels of roasted peanuts so as to cause the latter to be reduced to the form of a rather stiff, semi-solid substance, somewhat resembling real butter in appearance and consistency. Peanut butter consists essentially of finely divided particles of nut kernels mixed with oil. These particles of nut kernels contain protein and carbohydrate with minute particles of oil pocketed in a semi-mass. This oil is liberated from the peanut kernels during the grinding operation and runs together to form a carrier liquid, in which the particles of ground kernel are suspended. The greater part of the contained oil is liberated by the grinding operation.

I have found that the normal oil content of the peanut kernels, 40 to 50 per cent. of the entire weight, is insufficient to overcome the objectionable dryness in the taste of ordinary peanut butter, and even when honey is added, this objectionable feature is not removed. Again, natural bees' honey upon being exposed to light and air tends to crystallize and harden, and to overcome this objection, I add to the compound 5 to 20 per cent. of an edible oil, for instance, green peanut oil or its equivalent by which the oil content of the compound is increased above that naturally or normally present, in order to improve the keeping qualities of the compound, to eliminate objectionable dryness to the taste, and to enable the compound to be more readily spread, as a butter or paste, on other articles of food.

While the addition of the added edible oil very materially improves the product in many respects, yet there has been a tendency thereof to separate out of the solids of the mixture and produce an oleaginous stratum on the top thereof when the compound is maintained within a suitable container and particularly following periods of warm weather or high temperatures and disuse. This separated oil may be readily mixed into the compound again by a simple stirring or agitating motion, but the presence of the oil stratum is objectionable to many users and most frequently the oil is removed from the container by a pouring operation when its presence is noted, leaving the compound in a state of reduced oil content. The separation of the oil following periods of storage or subjection to elevated temperatures, I have found, can be greatly minimized in the preparation of the product by separately heating the added oil and honey to the same temperature of the peanut butter when the latter is discharged from the grinding mill, which is roughly of the order of 160° F.

From the grinding mill, the products are introduced into a stirring vat indicated at 2 where the compound is reduced to its final commercial form, and subsequently placed in commercial containers, such as bottles or metallic receptacles, in which the compound is transported and sold.

A typical example of the present invention comprises 70% by weight of ordinary peanut butter, 15% by weight of strained bees' honey and 15% by weight of a blending oil selected from a group comprising green peanut oil, corn oil, cotton seed oil, cocoanut oil or other equivalent edible oils which may or may not be hydrogenated. I have found this increased percentage of the added blending oil to very materially improve the composition of the product in the particulars set forth and to produce one of excellent keeping qualities under ordinary conditions of household service. It will be understood that in lieu of natural bees' honey, I may employ in my composition other equivalent sweetening agents rich in sugar, such as granulated or brown sugar, syrup, sorghum or glucose in syrup form. Also, the relative proportions of the ingredients as set forth in the above example are subject to certain modification without departing from the scope of the invention.

What is claimed is:

The method of preparing nut butter to minimize gravitational separation of the ingredients thereof, which comprises grinding peanut kernels alone to the form of a paste or butter, then adding to the peanut butter, while the latter is at the temperature of grinding, quantities of an edible oil and strained bees' honey each heated to approximately 160° F., and thoroughly mixing the aforesaid ingredients, the added oil and honey when added to the peanut butter possessing approximately the same temperature of the peanut butter immediately following discharge of the latter from the grinding or reduction zone in which it was produced.

FREDERICK H. HOFFMAN.